United States Patent [19]
Hansson et al.

[11] Patent Number: 5,382,938
[45] Date of Patent: Jan. 17, 1995

[54] PTC ELEMENT

[75] Inventors: Tomas Hansson, Enköping; Per-Olof Karlström, Västerås, both of Sweden

[73] Assignee: Asea Boveri Brown AB, Vasteras, Sweden

[21] Appl. No.: 783,118

[22] Filed: Oct. 25, 1991

[30] Foreign Application Priority Data

Oct. 30, 1990 [SE] Sweden .............. 9003448-9
Nov. 30, 1990 [SE] Sweden .............. 9003814-2

[51] Int. Cl.⁶ .............. H01C 7/10; H01C 10/10
[52] U.S. Cl. .............. 338/22 R; 338/22 SD; 338/99; 338/114; 338/232; 338/260
[58] Field of Search .......... 338/99, 114, 22 R, 225 D, 338/235, 232, 260

[56] References Cited
U.S. PATENT DOCUMENTS

| | | |
|---|---|---|
| 2,978,665 | 4/1961 | Vernet et al. |
| 3,878,501 | 4/1975 | Moorhead ............. 338/22 R |
| 3,914,727 | 10/1975 | Fabricios |
| 4,331,861 | 5/1982 | Meixner |
| 4,414,052 | 11/1983 | Habata et al. |
| 4,698,614 | 10/1987 | Welch et al. |
| 4,924,204 | 5/1990 | Uchida |
| 4,939,498 | 7/1990 | Yamada et al. ............. 338/22 R |

*Primary Examiner*—Marvin M. Lateef
*Attorney, Agent, or Firm*—Watson, Cole, Grindle & Watson

[57] ABSTRACT

A PTC element has at least one body and two electrodes. The body or bodies has/have and is/are two parallel surfaces, of an electrically conductive polymer composition with a positive temperature coefficient. At least one of the parallel surfaces on the body, or on one of the bodies, of polymer composition is in free contact with an electrode or with a parallel surface on another body of electrically conductive polymer composition. A pressure device exerts a pressure directed perpendicularly to the parallel surfaces on the body, or the bodies, on the electrodes. The pressure device is preferably provided with pressure-exerting devices with the ability to be resilient. After changing from a low resistance to a high resistance state, the PTC element returns to the initial resistance and is reusable after having been subjected to short-circuit currents. The parallel surfaces on the body, or the bodies, of polymer composition may be concentric.

47 Claims, 6 Drawing Sheets

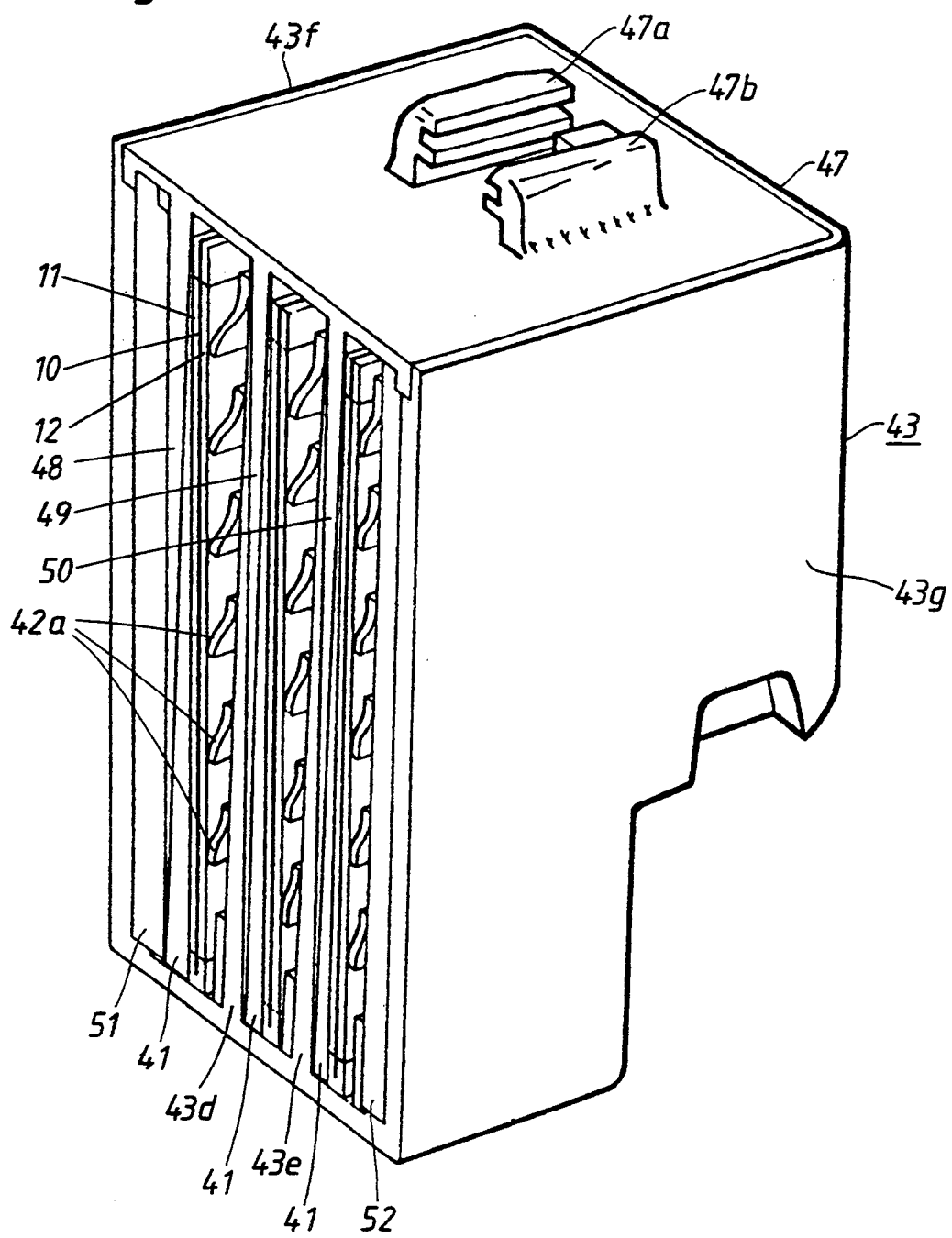

PTC ELEMENT

BACKGROUND AND SUMMARY OF THE INVENTION

A PTC element often comprises a body of an electrically conductive polymer composition a resistivity with a positive temperature coefficient, the body defining two parallel end surfaces, and two electrodes arranged in contact with the end surfaces for carrying current through the body. The polymer composition of the body includes a polymer material and an electrically conductive powdered material distributed in the polymer material. The expression PTC element is the accepted term for an element whose resistivity has a positive temperature coefficient. PTC elements are used in electric circuits as overcurrent protection.

The resistance of a PTC element of the above-described kind is low, for example a few m$\Omega$, in the normal operating range of the element, which may extend to, for example, 80° C. and increases slightly with the temperature. If the temperature of the element exceeds this value, for example because of an overcurrent, the resistance increases more rapidly, and when exceeding a certain temperature, the element suddenly changes from a low resistance to a high resistance state in which the resistance may amount to one or a few tens of k$\Omega$. It is well-known that the resistance of the PTC element, after changing from low resistance to high resistance state, does not return to the initial resistance. In more serious cases when it is subjected to very great electrical stresses, such as short-circuit currents, blistering and crack formation occur in central or other parts of the polymer composition of the PTC element, so that the the PTC element can no longer function, that is, the element becomes destroyed.

In the known PTC elements the aim has been to secure the electrodes as efficiently as possible to the body of polymer composition to achieve the best possible electrical contact and hence minimize the contact resistance. To achieve the good securing of the electrodes, they are normally formed with an uneven surface structure on the side facing the body of polymer composition, so that the polymer composition during the manufacturing of the PTC element is able to melt and penetrate into cavities in the electrode surface. Usually, the electrodes consist of metal foils and are applied by being pressed onto the body with heating.

According to the present invention it has proved to be possible to counteract or completely eliminate the abovedescribed unfavourable processes during operation of the PTC elements and to produce a PTC element which, after transition from a low resistance to a high resistance state, returns to the initial resistance, and which is reusable also after having been subjected to short-circuit currents. Further, the PTC element changes its resistance in case of a lower energy development, that is, its current limiting properties are improved.

According to the invention, the above result is obtained by producing at least one electrical contact between an electrode and a body of electrically conductive polymer composition or between two bodies of electrically conductive polymer composition in the PTC element by the electrode making free contact with the mentioned body or that the mentioned bodies make free contact with each other while maintaining a pressure directed perpendicular to the contact surface in question by means of a pressure device.

More particularly, the present invention relates to a PTC element comprising a body, provided with two parallel surfaces, of an electrically conductive polymer composition with a positive temperature coefficient, in which the parallel surfaces on the body of polymer composition or one of the parallel surfaces on the body of polymer composition and one of the parallel surfaces on another body included in the PTC element or on one of several other bodies included in the PTC element and arranged geometrically parallel to the first-mentioned body, which latter body or bodies, respectively, is/are of the same or a different electrically conductive polymer composition with a positive temperature coefficient, are arranged in electrical contact with electrodes, included in the PTC element, for carrying current through the body, or bodies, of polymer composition, characterized in that the body of polymer composition, if only one such body is included in the PTC element, with at least one of its parallel surfaces is adapted to make free contact with one of the electrodes, or at least one of the bodies of polymer composition, if more than one such body is included in the PTC element, with at least one of its parallel surfaces is adapted to make free contact with one of the electrodes or with the other body, or one of the other bodies, of polymer composition, and that a pressure device is adapted to exert on the electrodes a pressure directed perpendicular to the parallel surfaces on the body, or bodies, of polymer composition. The expression "to make free contact" here and in the following means that the respective elements making free contact are not fixed to each other but make contact with each other only by abutment.

A feasible explanation of the result obtained according to the invention may be the following. During normal passage of current, a low contact resistance is maintained between the elements which make free contact with each other due to the pressure exerted on the contact surface. In case of short-circuit currents, electrodynamic repulsion forces occur between the elements making free contact with each other, which leads to a separation of the elements and hence a reduction of the number of contact points between electrode and conducting particles in the body of the polymer composition making free contact therewith or between conducting particles in bodies of the polymer composition making free contact with each other. This leads to a current concentration at the remaining contact points, which causes molten phases to occur in the polymer composition at the contact surface and the PTC element to trip at the contact surface without the rest of the polymer composition being subjected to any stress with ensuing unfavourable effects. Since the pressure against the contact surface remains, when the surface is still hot after the short circuit, the original contact and the original contact resistance may be reestablished between the elements making free contact with one another.

The polymer composition may be of a known kind and its composition or constituents constitute no part of the present invention. Thus, the polymer material may consist of thermoplastic resins, elastomers, thermosetting resins or mixtures thereof used in prior art polymer compositions with PTC behaviour. As examples of suitable polymer materials may be particularly mentioned polyolefins such as polyethylene, crosslinked polyethylene, polypropylene, polybutene and copolymers or ethylene and propylene. The polymer material preferably has a crystallinity of at least 5%. The conducting powdered material preferably consists of conducting carbon black or conducting soot. However, it is possible, per se, to use, together with or instead of the mentioned powdered material, conducting particles of another kind, such as particles of metallic materials, for example nickel, cobalt, copper and silver. A suitable particle size of the powdered material is 0.01–10 μm and a suitable content of the powdered filler is 10–60 percent of the total volume of the powdered filler and the polymer material. The resistivity of the polymer composition is preferably within the range of 10 mΩcm–100 Ωcm and has the ability, after a transition, to exhibit a resistivity of 1 Ωcm–1 kΩcm. If more than one body of electrically conductive polymer composition is included in the PTC element, the bodies may be of the same or different polymer composition and then with the same or different resistivity.

In those embodiments of the present invention in which at least one of the electrodes is firmly secured to a body of conducting polymer composition, such an electrodes or such electrodes may be of a conventional kind. They may consist of metal foils or of thin metal plates or metal nettings which are rolled on the polymer composition in heated state or fixed in some other way thereto, such as by spraying or vapour deposition. Usually, the surface facing the polymer composition has an irregular structure. The electrodes may also consist of a combination of two or more elements, for example a thin foil of nickel and a thicker plate of copper fixed thereto. According to one embodiment of the present invention, such fixed electrodes may consist of a tight plate or foil or metal, which on the side facing the polymer composition is coated with a layer of metal with an irregular surface structure, applied by thermal spraying such as plasma spraying, flame spraying or arc spraying, which metal layer comprises protruding portions with a height of 1–50 μm and a width of 1–50 μm.

In those embodiments of the present invention where at least one of the electrodes makes free contact with a body of conducting polymer composition, such an electrode may in itself, that is, apart from the fact that it is not fixed to the body of conducting polymer composition, be of the same kind as indicated in the preceding paragraph. It may also consist of a more or less thick plate with a surface with an even structure facing the body of conducting polymer composition. It is also possible, per se, to use other high conductivity materials than metallic materials in the electrodes, such as polymer material containing very high contents of electrically conductive powdered fillers, such as conducting carbon black, conducting soot, copper or nickel.

The pressure which is maintained on the electrodes perpendicularly to the parallel surfaces on the body, or bodies, of polymer composition preferably amounts to at least 0.1 MPa (14.7 psi). Especially preferred is a pressure of 0.1 MPa–10 MPa (14.7 to 1470 psi).

The pressure on the electrodes of the PTC element may be achieved purely mechanically or by utilizing forces generated by electric currents. When utilizing purely mechanical forces, the pressure device may, for example, consist of two plates arranged in parallel with the parallel surfaces of the body, or bodies, of electrically conductive polymer composition and arranged outside the electrodes, and of drawing devices or clamping devices arranged in or adjacent the plates. When utilizing forces generated by electric currents, the pressure device may comprise plates of high conductivity material making contact with the electrodes, in which the current paths are adapted to be substantially parallel to the parallel surfaces of the body, or bodies, and directed in substantially the same direction as the plates, or yokes of a ferromagnetic material arranged outside the plates of high conductivity material.

According to a particularly preferred embodiment of the invention, the pressure device is provided with pressure-exerting devices with the ability to be resilient. Such a design of the pressure device significantly facilitates a separation of the electrode and the body of polymer composition making free contact with each other, or of bodies of polymer composition making free contact with each other, at short-circuit currents. In a preferred embodiment the pressure device comprises two pressure-exerting parts, making contact with the electrodes of the PTC element by abutment, and a layer of rubber or another elastic material, for example an elastic plastic, is arranged between one of the electrodes and one of the pressure-exerting parts.

According to another preferred embodiment the pressure device comprises parts exerting pressure against the electrodes of the PTC element, and at least one resilient element arranged between the pressure-exerting parts outside en electrode.

According to an additional embodiment of the invention, a PTC element according to the invention is stacked on top of another PTC element according to the invention in the same pressure device, which is thereby adapted to exert a pressure directed perpendicularly to the parallel surfaces of the body, or the bodies, of polymer composition in each one of the PTC elements, and the outwardly-facing electrodes are electrically parallel-connected as are the inwardly-facing ones, which may possibly be designed to form one single electrode. Preferably, the device is formed with separate inwardly-facing electrodes and with a layer of rubber or other elastic material, such as elastic plastics, arranged between the electrodes. These embodiments with parallel-connected outwardly-facing and inwardly-facing electrodes have very good current-limiting properties also in case of a total area of the PTC elements which is relatively large.

According to yet another embodiment of the invention, the body of polymer composition, if only one such body is included in the PTC element, or the bodies of polymer composition, if more than one such body is included in the PTC element, at surfaces exposed between the electrodes is/are surrounded by a casing of insulating material, which may advantageously be of the same kind and thus have the same physical properties as the polymer material which is included in the polymer composition. The casing of insulating material increases the dielectric strength of the PTC element. The reason is that the casing prevents flash-over between particles of the conducting powdered material, which may be exposed at surfaces of the polymer composition, which are exposed between the electrodes, when the PTC element is subjected to short-circuit currents.

According to a particularly preferred embodiment of the invention, the pressure device comprises a pressure-absorbing frame arranged around the electrodes and the body, or bodies, of electrically conducting polymer composition, with wedge-shaped elements insertable into the frame. The frame may have the shape of an apparatus housing provided with a lid and at least one of the wedge-shaped elements may be arranged in the apparatus housing itself and at least one of the wedge-shaped elements may be secured to the lid.

Another embodiment of the invention is characterized in that the parallel surfaces on the body, or bodies, of electrically conductive polymer composition consist of concentric surfaces. The electrodes are thereby concentric with the mentioned concentric surfaces of the body, or bodies, of polymer composition. This embodiment requires an extremely small space.

A PTC element of the kind mentioned in the preceding paragraph may be designed such that, inside an electrode which is arranged at an inwardly-facing concentric surface on the body, or on that body of polymer composition which is arranged furthest towards the interior, there is arranged a body which is expansible in a direction perpendicular to the concentric surface and that, outside an electrode which is arranged at an outwardly-facing concentric surface of the body, or on that body of polymer composition which is located furthest towards the exterior, there is arranged a counter-support or this electrode is itself designed to constitute a counter-support.

BRIEF DESCRIPTION OF THE DRAWINGS

The invention will be explained in greater detail by describing embodiments with reference to the accompanying drawings, wherein FIG. 11 shows a perspective view of a part of the same device in a vertical section in assembled state.

DETAILED DESCRIPTION OF THE PREFERRED EMBODIMENTS

Figure 1:
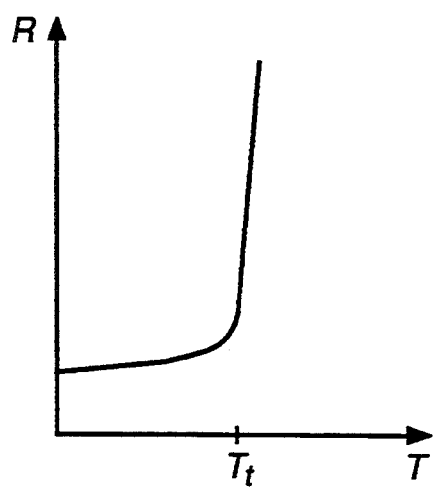
FIG. 1 shows a curve of the resistivity as a function of the temperature for an electrically conductive polymer composition included in a PTC element according to the present invention.

FIG. 1 shows the resistivity R as a function of the temperature T for the electrically conductive polymer composition which is included in the PTC element according to the present invention. $T_t$ is the temperature, the transition temperature, at which the polymer composition changes from a low resistance to a high resistance state.

Figure 2:
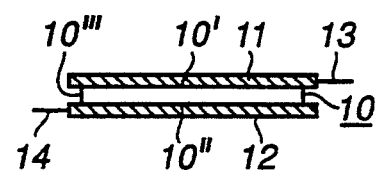
FIGS. 2 and 3 show PTC elements consisting of two electrodes and respectively one and two bodies of an electrically conductive polymer composition arranged between the electrodes.

The PTC element according to FIG. 2 comprises a centrally arranged body 10 of an electrically conductive polymer composition with a positive temperature coefficient, for example consisting of 67 percent by volume polyethylene (e.g. LUPOLEN 6031M from BASF, Germany) and 33 percent by volume carbon black (e.g. N 550 from Degussa AG, Germany), in the form of a rectangular 1 mm thick plate as well as two electrodes 11 and 12 with associated terminals 13 and 14, respectively, arranged at the parallel end surfaces 10' and 10" of the body (the flat sides of the plate). The electrode 11 consists of an 0.5 mm thick plate of nickel with an even surface structure on both sides. On the outside, the plate is coated with a thin layer of copper. It makes free contact with the body 10, that is, makes contact only by abutting the body, and thus not being fixed to the body. The electrode 12 consists of an 0.3 mm thick copper foil which on the side facing the body 10 is coated with an 0.1 mm thick layer of copper with uneven surface structure, applied by plasma spraying. The electrode 12 is fixed to the polymer by being pressed against the body 10 when the body has been heated, so that the polymer material in liquid state may penetrate into irregularities in the inwardly-facing side of the electrode.

Figure 3:
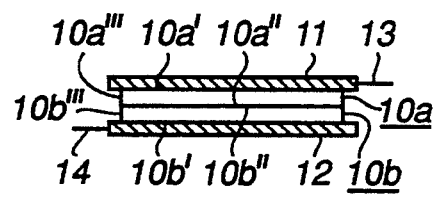

The device according to FIG. 3 includes two bodies, 10a and 10b, of the same electrically conductive polymer composition as that in the body 10 in FIG. 1, in the form of 1 mm thick rectangular plates with the parallel surfaces 10a', 10a" and 10b', 10b", respectively These plates make electrical contact only by abutment without being fused or otherwise fixed to each other, that is, make free contact with each other. The electrodes 11 and 12 may be of the same kind as the electrodes 11 and 12 in FIG. 1. However, the electrode 11 may also be of the same kind as the electrode 12 and, like this electrode, be fixed to the body 10a. In the device according to FIG. 3, the bodies 10a and 10b may be of different electrically conductive polymer compositions and have different resistivities to modify the properties of the PTC element. The device may also be modified so as to comprise more than two bodies (10a and 10b) of conductive polymer composition with the same or a different resistivity. If the electrodes are fixed to adjacent bodies of electrically conductive polymer composition, at least one of the bodies must make free contact with another one of the bodies. If one of or both of the electrodes make free contact with an adjacent body of electrically conductive polymer composition, all the polymer bodies may be fixed to each other, for example by fusion.

Figure 4:
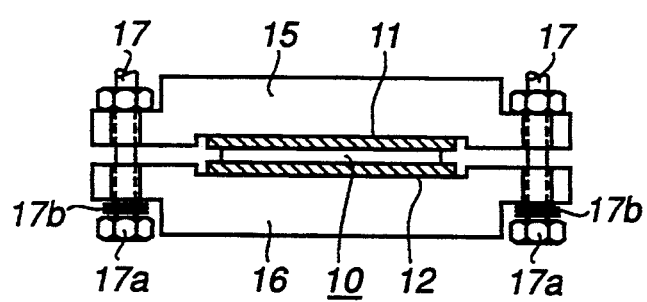
FIGS. 4 and 5 show cross sections of two different embodiments of a PTC element according to the present invention with a pressure device acting purely mechanically.

FIG. 4 illustrates a device according to the invention in which a PTC element according to FIG. 2 is arranged in a pressure device comprising two plates 15, 16, which are parallel to the parallel end surfaces of the body 10 (the flat sides of the plate 10) and to the electrodes 11 and 12. The terminals 13 and 14 are not shown in the figure. The plates are of electrically insulating material, for example resin reinforced with glass fibre.

The pressure against the electrodes and against the end surfaces of the body 10 is brought about by tightening a number of bolts 17. Between the bolt heads 17a and one of the plates 16 of the pressure device, stiff springs 17b are arranged which are not completely compressed when the PTC element is pressurized and prepared for normal operation. In case of a short circuit, the springs may therefore be further compressed, which permits the electrode 11 to be separated from the body 10.

Figure 5:
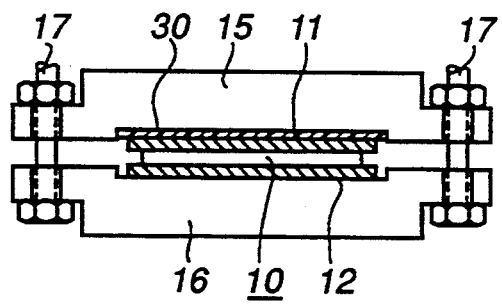

The device according to FIG. 5 differs from the device according to FIG. 4 in that the springs 17b are not included and in that a 1 mm thick mat 30 of rubber is arranged between the electrode 11 and the plate 15. Such a mat of rubber may possibly be arranged between the electrode 12 and the plate 16 as well.

Instead of the PTC element according to FIG. 2, a PTC element according to FIG. 3 may be arranged, in an analogous manner, in the devices according to FIGS. 4 and 5.

Figure 6:
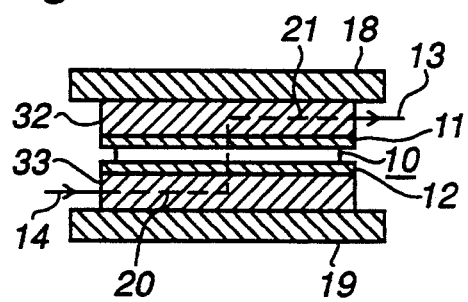
FIGS. 6 and 7 show two cross sections, perpendicular to each other, of a PTC element according to the present invention with a pressure device in which electric currents are utilized to generate compressive forces.
Figure 7:
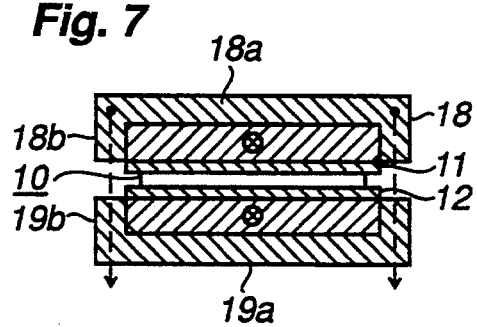

In the device illustrated in FIGS. 6 and 7, a PTC element according to FIG. 2 or 3 is provided with plates 32, 33, arranged outside electrodes 11, 12, of copper or other high conductivity material between two opposite yokes 18 and 19, respectively, of iron or other ferromagnetic material. The iron yokes are U-shaped with a base 18a and 19a, respectively, with a flat shape and with short legs 18b and 19b, respectively. Alternatively, only plates corresponding to the base 18a and 19a, respectively, may be used. By connecting the PTC element to the network in such a way that the current paths 20 and 21, respectively, become parallel to the end surfaces of the body 10 and directed in the same direction, as shown by dashed lines and arrows in FIG. 6, an attractive force is achieved between the yokes, which is illustrated by dashed arrows in FIG. 7. In this way, the body 10 is exposed to pressure between the end surfaces when current is conducted through the PTC element.

Figure 8:
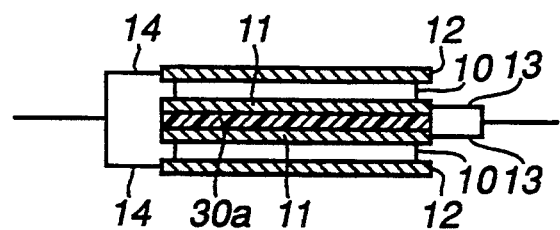
FIG. 8 shows a device comprising two PTC elements with parallel-connected electrodes.

In the device according to FIG. 8, two PTC elements of the kind shown in FIG. 2 are arranged one above the other with an intermediate mat 30a of rubber. The two electrodes 11 are parallel-connected as are the two electrodes 12. The PTC elements can be subjected to pressure in a manner analogous to that of the PTC elements according to FIG. 2 in the devices according to FIGS. 4 and 5 with the two electrodes 12 making contact with the plates 15 and 16. When arranging a rubber mat 30a between the two electrodes 11 in accordance with FIG. 8, no advantage is gained by utilizing springs 17b according to FIG. 4 or a rubber mat 30 according to FIG. 5, If the PTC element according to FIG. 8 is formed without a rubber mat 30a, that is, with the two electrodes 11 making contact with each other or replaced by one single electrode which on both sides makes contact with bodies 10 of electrically conductive polymer composition and this PTC element is arranged in the pressure devices according to FIGS. 4 and 5, it is an advantage to retain the springs 17b and the rubber mat 30. Instead of the PTC element according to FIG. 2, a PTC element according to FIG. 3 may be used in the cases described with reference to FIG. 8. As explained before, a PTC element according to FIG. 8 has particularly good current limiting properties.

Figure 9:
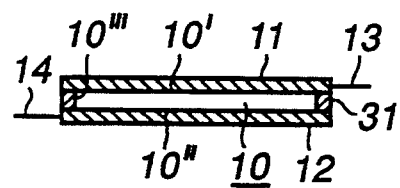
FIG. 9 shows a PTC element which is provided with an insulating casing at surfaces exposed between the electrodes.

The PTC element according to FIG. 9 is of the same kind as that shown in FIG. 2 but is provided with a casing 31 of insulating material, preferably of polyethylene, which is the polymer material included in the body 10 of electrically conductive polymer composition. The casing 31 is adapted to surround the surfaces 10''' on the body 10 which are exposed between the electrodes 11 and 12, which, as explained above, increases the dielectric strength of the PTC element. The PTC element according to FIG. 9 may be arranged in the same way as the PTC element according to FIG. 2 in the pressure devices according to FIGS. 4 and 5. Instead of a PTC element according to FIG. 2, a PTC element according to FIG. 3 may be used, in an analogous manner, in a PTC element according to FIG. 9, the casing surrounding the surfaces 10a''' and 10b''' on the bodies 10a and 10b. The casing 31 of insulating material may be applied around the body 10 or the bodies 10a and 10b by applying a ring of insulating material around the body 10 or the bodies 10a and 10b in a tool suitable therefor and be brought to fuse together, by heating, with the edges on the body 10 or the bodies 10a and 10b.

Figure 10A:
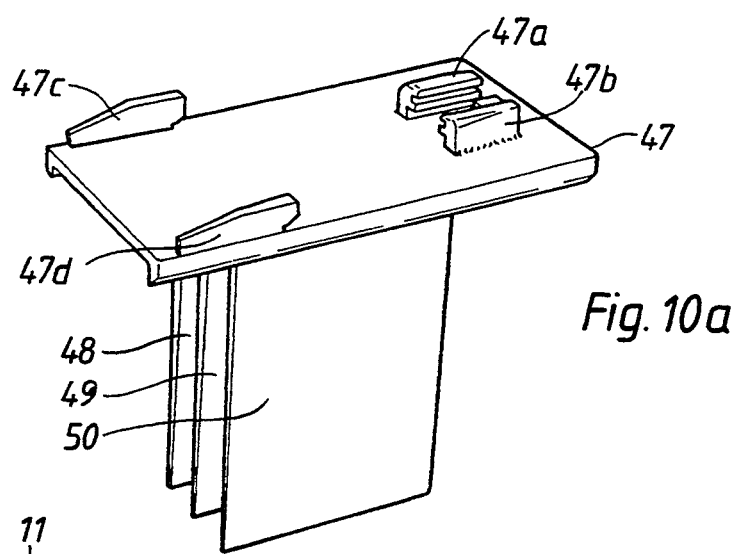
FIGS. 10a, 10b and 10c show perspective views of different parts of a device according to the invention in disassembled state.
Figure 10B:
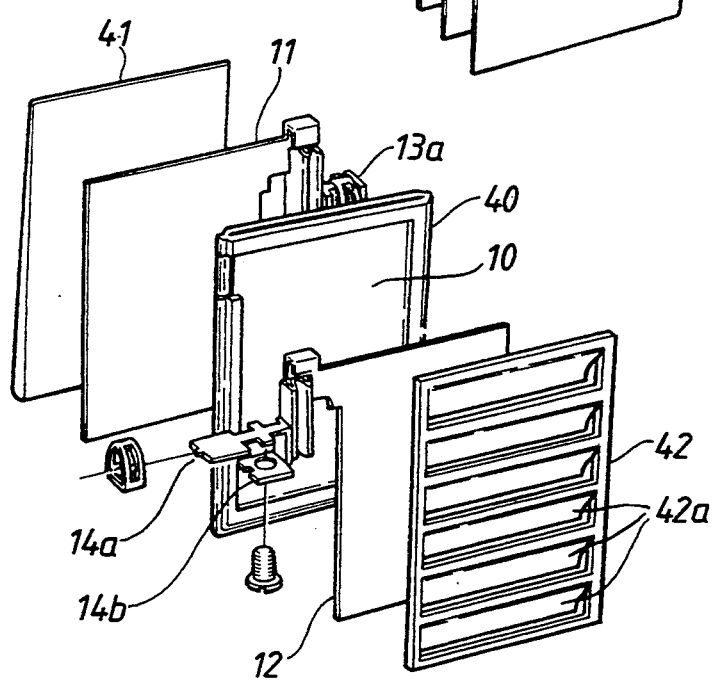
Figure 10C:
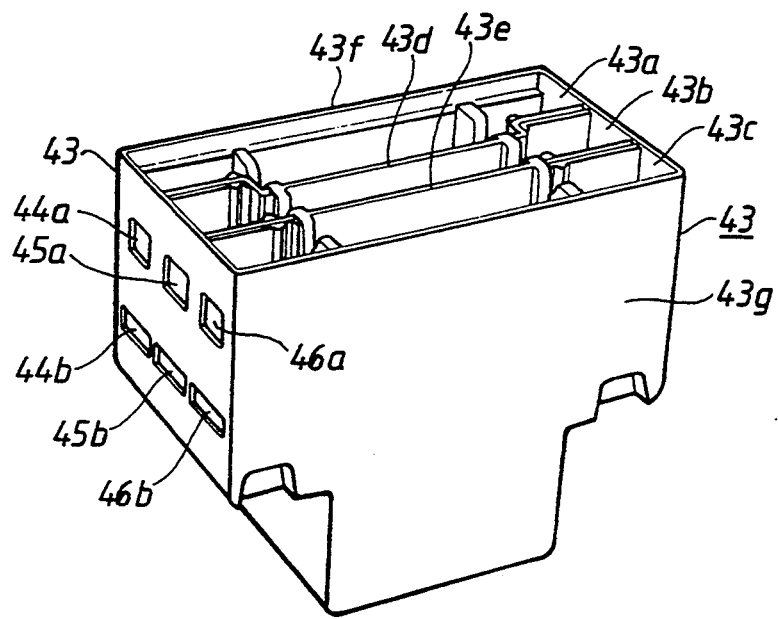

The device according to FIGS. 10a, b, c and 11 comprises three identical PTC elements, one of which is shown with the parts separated in FIG. 10b. The body 10 of electrically conductive polymer composition, for example of the same kind as in FIG. 2, is arranged in a plastic frame 40 which extends around the body. The two electrodes 11 and 12 consist of 1 mm thick silver-plated plates of copper, which make free contact with the body 10, that is, only by abutting it, and thus not being fixed to it. Each electrode is provided with alternative conductor terminals 13a and 14a for cable connection and 13b (not shown) and 14b for connection to a bar, respectively. Outside the electrodes 11 there is arranged a wedge-shaped, loose plate 41 and outside the electrode 12 there is arranged a loose spring plate 42 of thin sheet metal. The spring plate is provided with a plurality of tongues 42a cut out and bent out from the plate, which give the plate its resilient properties. A package comprising the plates 41 and 42 and electrodes 11 and 12 arranged therebetween and with an intermediate body 10 of conducting polymer composition is arranged in each one of three compartments 43a, 43b and 43c in an apparatus housing 43 with two partitions 43d and 43e forming the compartments. The partitions are parallel to two opposite, parallel walls 43f and 43g in the apparatus housing. The apparatus housing is provided with hollows 44a and 44b for alternative connection of a conductor to the attachment 14a or 14b in the compartment 43a, with hollows 45a and 45b for alternative connection of a conductor to the attachment 14a or 14b in the compartment 43b, and with hollows 46a and 46b for alternative connection of a conductor to the attachments 14a or 14b on an electrode 12 in the compartment 43c. On the opposite, not visible wall of the apparatus housing, there are corresponding recesses for connection of conductors to the attachments 13a and 13b on each electrode 11. The pressure between the electrode 11 and 12 and the body 10 in each one of the packages in the compartments 43a, 43b and 43c is brought about by applying a lid 47 with wedge-shaped plates 48, 49 and 50, fixed to the lid, on the apparatus housing, a wedge-shaped plate being inserted into each one of the compartments 43a, 43b and 43c adjacent a plate 41 located there. The lid is provided with mechanical attachments 47a, 47b, 47c and 47d for mounting. As will be clear from FIG. 11, the apparatus housing is provided with plane-parallel reinforcing walls 51 and 52 on the pressure-absorbing sides. The device according to FIGS. 10a, b, c and 11 is intended to be connected into a three-phase cable with a PTC element connected into each of the three phase conductors. The apparatus housing 43 with outer walls 43f and 43g, reinforcing walls 51 and 52, lid 47 and wedge-shaped plates 41, 48, 49 and 50 are all manufactured from an electrical insulating material, for example a polyamide, to which a filler, for example in the form of short glass-fibres, has been added. The PTC element according to FIG. 12 comprises a tubular body 10 of an electrically conductive polymer composition with a positive temperature coefficient, for example of the same composition as that used in the body 10 in FIG. 2. The interior cylindrical envelope surface is designated 10' and the exterior also cylindrical envelope surface is designated 10". In a cross section perpendicular to the centre line of the tubular body, each one of the envelope surfaces forms a circle, The wall thickness of the tubular body amounts to at least 1 mm. The PTC element also has two electrodes 11 and 12 which are arranged in contact with the envelope surfaces 10' and 10" and concentric therewith. The electrodes are provided with terminals 13 and 14, respectively. The electrode 11 consists of an 0.5 mm thick tube of nickel with an even surface structure on both sides. On the outside the tube is coated with a thin layer of copper. The tube is slitted in the longitudinal direction so that one edge at the slit is able to slide over the other. The electrode 11 makes free contact with the body 10, that is, makes contact only by abutting the body along the envelope surface 10' under pressure, and thus not being fixed to the body. The electrode 12 consists of an 0.3 mm thick copper foil which on the side facing the body 10 is coated with an 0.1 mm thick layer of copper with an uneven surface structure, applied by plasma spraying. The electrode 12 is fixed to the polymer by being pressed against the body 10, after the body has been heated so that the polymer material in liquid state may penetrate into irregularities in the inwardly-facing side of the electrode. Inside the electrode 11 there is arranged a body 31, which is expansible in a direction perpendicular to the envelope surface 10' and the electrode 11 and outside the electrode 12 there is a counter-support 32, for example in the form of a tube of resin reinforced with fibre-glass, which is manufactured in situ, for example by applying the glass-fibre material and the resin in uncured state onto the electrode 12, and thereafter curing the resin. The expansible body 31 consists in the exemplified case of a tubular body 31a of rubber or other elastic material, which by means of a bolt 31b, arranged centrally in the body, with a bolt head 31c and a nut 31d and with washers 31e and 31f arranged at the end surfaces, inside the bolt head and the nut, may be brought to expand while achieving a desired pressure against the electrode 11. Instead of providing the PTC element with a separate counter-support, the electrode 12 may be formed as a tube with sufficient thickness to serve itself as a counter-support, such as in the form of a tube of copper which has been drawn down, on the spot, to the intended dimension to make contact directly with the envelope surface 10" on the body 10. In this case both electrodes of the PTC element are adapted to make free contact, under pressure, with the envelope surfaces 10' and 10" on the body 10. Such a copper tube may alternatively be adapted to serve only as a counter-support and then to make contact with the electrode 12. Also, when using a separate counter-support, the electrode 12 may, instead of being fixed to the body 10, be adapted to make free contact with the body 10. In a manner analogous to that of a copper tube, a sleeve of memory metal may be used as a separate counter-support or both as a counter-support and an electrode, the sleeve in expanded state being arranged on the spot around the PTC element and thereafter brought to resume its smaller dimension before the expansion. If the expansible body 31 consists of a body of metallic material, it may be suitable or necessary to arrange a layer of rubber or other electrically insulating material between the expansible body and the electrode 11.

Figure 12:
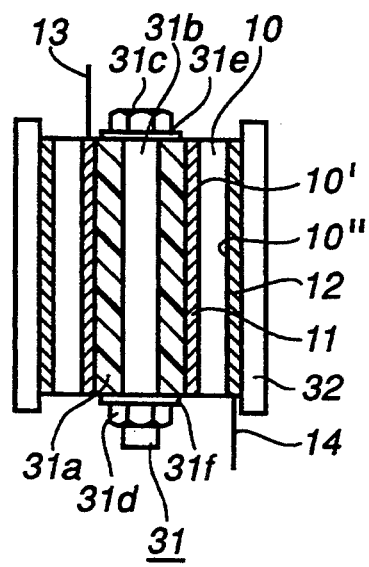
FIGS. 12 and 13 show PTC elements according to the invention consisting of two concentric electrodes and respectively one and two tubular concentric bodies of electrically conductive polymer composition arranged between the electrodes, and with a pressure device comprising an expansible body arranged inside the inner electrode as well as a counter-support arranged outside the outer electrode.
Figure 13:
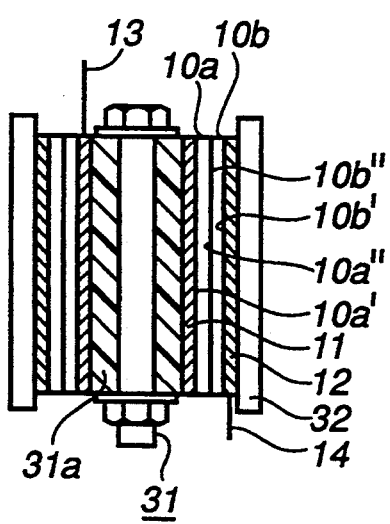

The device according to FIG. 13 includes two bodies 10a and 10b, of the same electrically conductive polymer composition as that in the body 10 in FIG. 12, in the form of concentric tubes with a wall thickness of 1 mm. The concentric envelope surfaces are designated 10a', 10a" and 10b', 10b", respectively. The two bodies 10a and 10b make free contact with each other, that is, make contact only by abutment under pressure, and thus not by being fused or otherwise fixed to each other. The electrodes 11 and 12 may be of the same kind as the electrodes 11 and 12 in FIG. 12. However, the electrode 11 may also be of the same kind as the electrode 12 in the first exemplified case, when this is fixed to the body of polymer composition, and thus be fixed to the body 10a. In the device according to FIG. 13, the bodies 10a and 10b may be of different electrically conductive polymer composition and have different resistivity to modify the properties of the PTC element. The device can also be modified so as to contain more than two concentric bodies (10a and 10b) of conductive polymer composition with the same or with different resistivity. If the electrodes are fixed to adjacent bodies of electrically conductive polymer composition, at least one of the bodies must make free contact with another one of the bodies. If one of or both of the electrodes make free contact with an adjacent body of electrically conductive polymer composition, all polymer bodies may be fixed to one another, for example by fusion. The device 31 with its parts for maintaining the electrodes 11 and 12 and the bodies 10a and 10b pressed against each other in the PTC element according to FIG. 13 is in the exemplified case the same as that in the PTC element according to FIG. 12.

Figure 14:
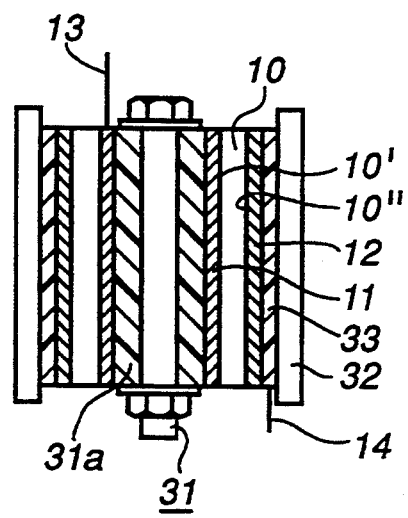
FIG. 14 shows a modification of the PTC element according to FIG. 12.

The PTC element according to FIG. 14 differs from the PTC element according to FIG. 12 in that a 1 mm thick layer 33 of rubber or other elastic material is arranged between the electrode 12 and the counter-support 32 to increase the capacity of the pressure-exerting parts to be elastic. As in the case according to FIG. 12, instead of being fixed to the body 10, the electrode 12 may make free contact with the body, that is, only by abutting the body along the envelope surface 10".

Figure 15:
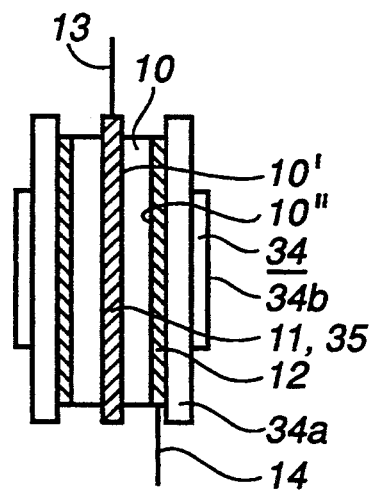
FIG. 15 shows a PTC element according to the present invention with a pressure device comprising a drawing or clamping device arranged outside the outer electrode.

In the device according to FIG. 15, the electrode consists of a solid wire of copper or nickel with a thin coating of nickel. The electrode 11 makes free contact with the body 10, that is, only by abutting the body along the envelope surface 10'. The body 10 and the electrode 12 are of the same kind as the corresponding elements in the device according to FIG. 12. The electrodes 11 and 12 and the body 10 are maintained pressed against each other by a drawing or clamping device 34, which, for example, may consist of a plate 34a arranged around the electrode 12 with an intermediate elastic insulating layer (not shown), the plate being provided with overlapping edges in the axial direction of the body 10, so that the diameter of the tubular body formed by the plate can be reduced by tightening a screw device 34b, in a manner analogous to that of a hose clamp, or by compressing two jaws with an internally semicylindrical shape in a direction perpendicular to the envelope surfaces 10' and 10" of the body 10. In the illustrated case, the electrode 11 itself serves as a counter-support. It is, of course, possible, instead of using an electrode 11 in the form of a solid wire, in accordance with FIG. 15, to use an electrode 11 in the form of a layer of the kind illustrated in FIGS. 12–14 and a counter-support arranged inside such an electrode in the form of a rigid body or an elastic device, for example of the kind designated 31 in FIGS. 12–14.

Figure 16:
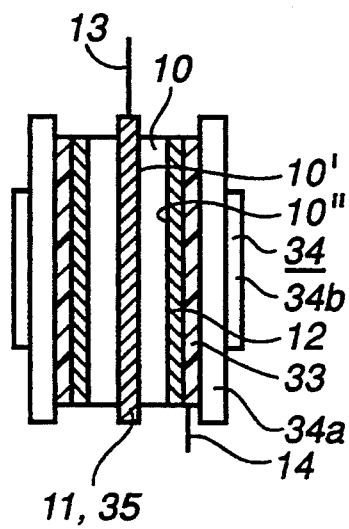
FIG. 16 shows a modification of the PTC element according to FIG. 15.

The PTC element according to FIG. 16 differs from the PTC element according to FIG. 15 in that a 1 mm thick layer 33 of rubber or other elastic material is arranged between the electrode 12 and the plate 34a to increase the capacity of the pressure-exerting parts to be elastic. Instead of the drawing of clamping device 34, it is possible to use a sleeve of memory metal, the sleeve of memory metal in expanded state being arranged in place around the PTC element and thereafter being brought to assume a smaller diameter. Such a sleeve may at the same time serve as an electrode in the case illustrated in FIG. 15.

Figure 17:
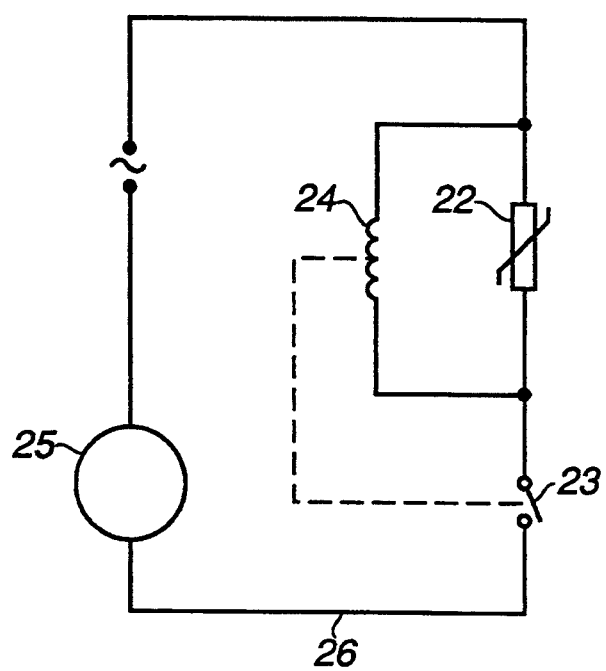
FIG. 17 shows a circuit diagram of a device in which the PTC element according to the invention is used as overcurrent protective device.

FIG. 17 exemplifies the use of the PTC element according to the invention as overcurrent and short-circuit protective device in an electric circuit 26 comprising a motor 25. The PTC element 22, for example of the kind shown in FIG. 4, 5, 12 or 13, is series-connected to a contact device 23. In parallel with the contact device there is an excitation coil 24, which is included in a fast magnetic tripping device for the contact device. The tripping device is adapted to influence the contact device for opening this at an over-current.

We claim:

1. A PTC element comprising a body of an electrically conductive polymer composition having a positive temperature coefficient, said body defining two parallel surfaces; a plurality of electrodes for carrying current through said body, one of said plurality of electrodes being in free contact with one of said parallel surfaces of said body; and a pressure device which presses said electrodes against said body in a direction perpendicular to said parallel surfaces of said body, said pressure device applying a pressure of at least 14.5 psi on said electrodes.

2. A PTC element according to claim 1, including at least two bodies provided with two parallel surfaces, each made of an electrically conductive polymer composition with a positive temperature coefficient.

3. A PTC element according to claim 2, wherein the bodies are of different electrically conductive polymer compositions with a positive temperature coefficient.

4. A PTC element according to claim 1, wherein said pressure device applies a pressure on the electrodes of 14.5 to 1450 psi.

5. A PTC element according to claim 1, wherein the pressure device is provided with pressure-exerting devices with the ability to be elastic.

6. A PTC element according to claim 1, wherein the pressure device comprises two parts exerting pressure on the electrodes of the PTC element and a layer of rubber or another elastic material is arranged between one of the electrodes and one of the pressure-exerting parts.

7. A PTC element according to claim 1, wherein the pressure device comprises parts exerting pressure on the electrodes of the PTC element and at least one resilient layer-formed element is arranged between the pressure-exerting parts.

8. A PTC element according to claim 1, wherein it is stacked on another said PTC element in the same pressure device, which is adapted to exert a pressure directed perpendicular to the parallel surfaces on the body of polymer composition in each of the PTC elements, and the outwardly-facing electrodes are electrically parallel-connected as are the inwardly-facing ones, said ones may be designed to form one single electrode.

9. A PTC element according to claim 8, wherein a layer of rubber or other elastic material or a resilient layer-formed element is arranged between the inwardly-facing electrodes.

10. A PTC element according to claim 1, wherein at least one of the electrodes consists of a tight plate or foil of metal, which on the side facing the body of polymer composition is coated with a layer of metal applied by thermal spraying, with an uneven surfaces structure comprising projecting portions with a height of 1–50 $\mu$m and a width of 1–50 $\mu$m.

11. A PTC element according to claim 1, wherein the body of polymer composition at surfaces exposed between the electrodes are surrounded by an insulating casing.

12. A PTC element according to claim 1, wherein the pressure device comprises two plates arranged outside the electrodes and in parallel with the parallel surfaces of the body of electrically conductive polymer composition, as well as drawing devices or clamping devices arranged in or at the plates.

13. A PTC element according to claim 1, wherein the pressure device comprises plates of a high conductively material arranged outside the electrodes, in which plates the current paths are substantially parallel to the parallel surfaces on the body and substantially directed in the same direction, as well as plates or yokes of a ferromagnetic material arranged outside said laths.

14. A PTC element according to claim 1, wherein the pressure device comprises a frame arranged around the electrodes and the body of electrically conductive polymer composition and wedge-shaped elements located within the frame to press the electrodes against the electrically conductive polymer composition.

15. A PTC element according to claim 14, wherein inside an electrode which is arranged at an inwardly-facing concentric surface on the body there is arranged a body which is expansible in a direction perpendicular to the concentric surface, and wherein outside an electrode which is arranged at an outwardly-facing concentric surface on the body there is arranged a counter-support or this electrode is itself designed to constitute a counter-support.

16. A PTC element according to claim 15, wherein the expansible body is elastic.

17. A PTC element according to claim 15, wherein between the electrode arranged at the inwardly-facing concentric surface and the expansible body there is arranged a layer of rubber or other elastic material or a resilient layer-formed element.

18. A PTC element according to claim 15, wherein between the electrode arranged at the outwardly-facing concentric surface and the counter-support there is arranged a resilient layer-formed element.

19. A PTC element according to claim 14, wherein the frame has the shape of an apparatus housing provided with a lid and wherein at least one of the wedge-shaped elements is arranged in the apparatus housing itself and at least one of the wedge-shaped elements is secured to the lid.

20. A PTC element according to claim 1, wherein the parallel surfaces on the body of electrically conductive polymer composition consist of concentric surfaces.

21. A PTC element according to claim 20, wherein outside an electrode which is arranged at an outwardly-facing concentric surface on the body there is arranged a clamping device, and wherein inside an electrode which is arranged at an inwardly-facing concentric surface on the body there is arranged a counter-support.

22. A PTC element according to claim 21, wherein between the electrode located at the outwardly-facing concentric surface and the clamping device a layer of rubber or other elastic material or a resilient layer-formed element is arranged.

23. A PTC element according to claim 21, wherein the counter-support consists of an elastic body.

24. A PTC element according to claim 21, wherein between the electrode arranged at the inwardly-facing concentric surface and the counter-support there is arranged a layer of rubber or other elastic material or a layer-formed resilient element.

25. A PTC element comprising at least two bodies, each provided with two parallel surfaces of electrically conductive polymer compositions with a positive temperature coefficient in which one of the parallel surfaces on the body of polymer composition and one of the parallel surfaces on the other body included in the PTC element are arranged in electrical contact with electrodes included in the PTC element for carrying current through the bodies of polymer composition, wherein at least one of the bodies of polymer composition has at least one of its parallel surfaces in free contact with one of the parallel surfaces of one other body of polymer composition, and including a pressure device which presses the electrodes against the bodies in a direction perpendicular to the parallel surfaces on the bodies of polymer composition, said pressure device applying a pressure of at least 14.5 psi on said electrodes.

26. A PTC element according to claim 25, wherein the bodies are of different electrically conductive polymer compositions with a positive temperature coefficient.

27. A PTC element according to claim 25, wherein said pressure device applies a pressure on the electrodes of 14.5 to 1450 psi.

28. A PTC element according to claim 25, wherein the pressure device is provided with pressure-exerting devices with the ability to be elastic.

29. A PTC element according to claim 25, wherein the pressure device comprises two parts exerting pressure on the electrodes of the PTC element, and wherein a layer of rubber or another elastic material is arranged between one of the electrodes and one of the pressure-exerting parts.

30. A PTC element according to claim 25, wherein the pressure device comprises parts exerting pressure on the electrodes of the PTC element, and wherein at least one resilient layer-formed element is arranged between the pressure-exerting parts.

31. A PTC element according to claim 25, wherein it is stacked on another said PTC element in the same pressure device, which is adapted to exert a pressure directed perpendicular to the parallel surfaces on the bodies of polymer composition in each of the PTC elements, and wherein the outwardly-facing electrodes are electrically parallel-connected as are the inwardly-facing ones which latter ones may be designed to form one single electrode.

32. A PTC element according to claim 31, wherein a layer of rubber or other elastic material or a resilient layer-formed element is arranged between the inwardly-facing electrodes.

33. A PTC element according to claim 25, wherein at least one of the electrodes consists of a tight plate or foil of metal, which on a side facing the body of polymer composition is coated with a layer of metal applied by thermal spraying, with an uneven surfaces structure comprising projecting portions with a height of 1–50 $\mu$m and a width of 1–50 $\mu$m.

34. A PTC element according to claim 25, wherein the bodies of polymer composition at surfaces exposed between the electrodes are surrounded by an insulating casing.

35. A PTC element according to claim 25, wherein the pressure device comprises two plates arranged outside the electrodes and in parallel with the parallel surfaces of the bodies of electrically conductive polymer composition, as well as drawing devices or clamping devices arranged in or at the plates.

36. A PTC element according to claim 25, wherein the pressure device comprises plates of a high conductivity material arranged outside the electrodes, in which plates the current paths are substantially parallel to the parallel surfaces on the bodies and substantially directed in the same direction, as well as plates or yokes of a ferromagnetic material arranged outside said plates.

37. A PTC element according to claim 25, wherein the pressure device comprises a frame arranged around the electrodes and the bodies of electrically conductive polymer composition and wedge-shaped elements located within the frame to press the electrodes against the electrically conductive polymer composition.

38. A PTC element according to claim 37, wherein the frame has the shape of an apparatus housing provided with a lid and wherein at least one of the wedge-shaped elements is arranged in the apparatus housing itself and at least one of the wedge-shaped elements secured to the lid.

39. A PTC element according to claim 25, wherein the parallel surfaces on the bodies of electrically conductive polymer composition consist of concentric surfaces.

40. A PTC element according to claim 39, wherein inside the electrode which is arranged at an inwardly-facing concentric surface on that body of polymer composition which is located furthest towards the interior there is arranged a body which is expansible in a direction perpendicular to the concentric surface, and wherein outside an electrode which is arranged at an outwardly-facing concentric surface on that body of polymer composition which is located furthest towards the exterior there is arranged a counter-support.

41. A PTC element according to claim 40, wherein the expansible body is elastic.

42. A PTC element according to claim 40, wherein between the electrode arranged at the inwardly-facing concentric surface and the expansible body there is arranged a layer of rubber or other elastic material or a resilient layer-formed element.

43. A PTC element according to claim 40, wherein between the electrode arranged at the outwardly-facing concentric surface and the counter-support there is arranged a layer of rubber or other elastic material or a resilient layer-formed element.

44. A PTC element according to claim 39, wherein outside an electrode which is arranged at an outwardly-facing concentric surface on that body of polymer composition which is located furthest towards the exterior there is arranged a drawing or clamping device, and wherein inside an electrode which is arranged at an inwardly-facing concentric surface on that body of polymer composition which is located furthest towards the interior there is arranged a counter-support.

45. A PTC element according to claim 44, wherein between the electrode located at the outwardly-facing concentric surface and the clamping device a layer of rubber or other elastic material or a resilient layer-formed element is arranged.

46. A PTC element according to claim 44, wherein the counter-support consists of an elastic body.

47. A PTC element according to claim 44, wherein between the electrode arranged at the inwardly-facing concentric surface and the counter-support there is arranged a layer of rubber or other elastic material or a layer-formed resilient element.

* * * * *

UNITED STATES PATENT AND TRADEMARK OFFICE
CERTIFICATE OF CORRECTION

PATENT NO.   : 5,382,938
DATED        : January 17, 1995
INVENTOR(S)  : Tomas HANSSON et al.

It is certified that error appears in the above-identified patent and that said Letters Patent is hereby corrected as shown below:

On the title page, item:

[73]   Assignee:   ASEA Brown Boveri AB, Västerås, Sweden

Signed and Sealed this

Twenty-second Day of August, 1995

Attest:

BRUCE LEHMAN

Attesting Officer

Commissioner of Patents and Trademarks